J. D. ROSS.
Vehicle Wheel.
No. 104,208. Patented June 14, 1870.
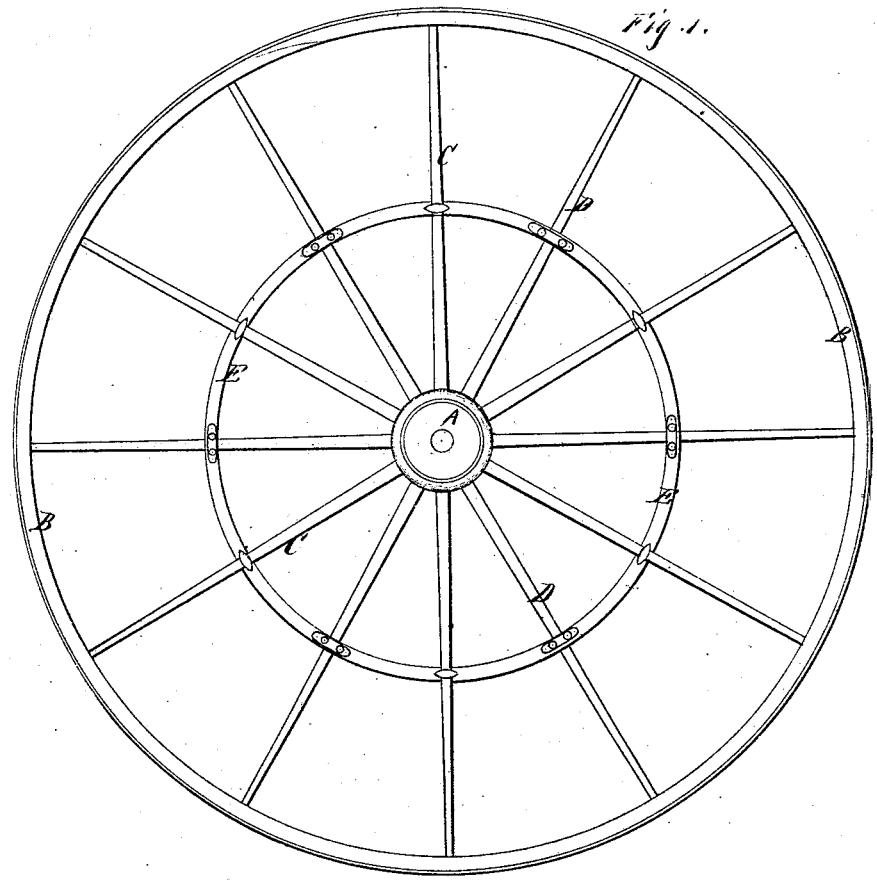
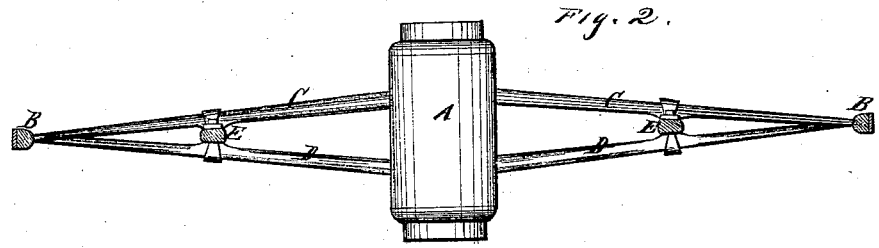
Witnesses.
Geo. H. Strong
Wm. R. Boone
Inventor.
John D. Ross
By his Atty's
Dewey & Co

United States Patent Office.

JOHN D. ROSS, OF TRUCKEE, CALIFORNIA.

Letters Patent No. 104,208, dated June 14, 1870.

IMPROVEMENT IN WHEELS FOR VEHICLES.

The Schedule referred to in these Letters Patent and making part of the same.

*To all whom it may concern:*

Be it known that I, JOHN D. ROSS, of Truckee, county of Nevada, State of California, have invented an Improved Wheel for Vehicles; and I do hereby declare the following description and accompanying drawing are sufficient to enable any person skilled in the art or science to which it most nearly appertains, to make and use my said invention and improvements without further invention or experiment.

My invention relates to wheels for vehicles, and its object is to construct the wheel in such a manner as to materially lessen the weight, and also add to the strength.

This is done by placing the spokes alternately to one side and the other of the center of the hub, and introducing one or more arches or rims between the central hub and the felly, so that the spokes from one end of the hub rest against one side of this rim, and those from the other end touch the other side of it, all being fastened to it by light clips.

Referring to the accompanying drawing for a more complete description of my invention—

A is the hub of the wheel, and

B, the felly.

The spokes C D are placed alternately to one side and the other of a line around the center of the hub, as shown, and may be set so as to leave the felly exactly over the center, or, as is preferable, so that the wheel will be slightly dishing, thus allowing the spokes to get a straight bearing, when the axle is set to run well.

In this case, the spokes C and D are set widely apart in the hub; but in a large wheel, one and a half inch will be sufficient to admit the arch or rim E.

This is placed at a point midway between the hub and the felly, and lies between the spokes C and D, touching each, and appearing, as it were, alternately before and behind a spoke, when seen from the side.

This arch is fastened to each spoke by a light clip of iron, and serves to transmit any strain through all the spokes, thus relieving the hub, so that, if kept screwed up tight, even if the spokes should become loose in the hub, the tire would not be loosened, as the arch acts as a secondary hub, which always maintains its full size.

The wheel is also very greatly strengthened, and made capable of resisting side strains, and is thus especially adapted to racing or trotting-wagons or sulkies, as it can never break down or twist the spokes out of the hub, and admits the use of a high wheel. If a very high wheel is to be used, two arches may be employed, but one will be sufficient for all ordinary wheels.

Having thus described my invention,

What I claim as new, and desire to secure by Letters Patent, is—

Constructing a wheel for vehicles with a secondary arch or rim, when placed between and attached to the spokes, substantially as and for the purpose herein described.

In witness whereof, I have hereunto set my hand and seal.

JOHN D. ROSS. [L. S.]

Witnesses:
 JAMES CANAVAN,
 A. M. WALKER.